US012572347B2

(12) United States Patent
Alluboyina et al.

(10) Patent No.: US 12,572,347 B2
(45) Date of Patent: Mar. 10, 2026

(54) IMPLEMENTING AN INFRASTRUCTURE MANAGEMENT SERVICE

(71) Applicant: Rakuten Symphony, Inc., Tokyo (JP)

(72) Inventors: Ravi Kumar Alluboyina, Santa Clara, CA (US); Sree Nandan Atur, Newark, CA (US); Pragash Vijayaragavan, San Jose, CA (US)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/006,973

(22) PCT Filed: Dec. 16, 2022

(86) PCT No.: PCT/US2022/053179
§ 371 (c)(1),
(2) Date: Jan. 26, 2023

(87) PCT Pub. No.: WO2024/129098
PCT Pub. Date: Jun. 20, 2024

(65) Prior Publication Data
US 2025/0298598 A1 Sep. 25, 2025

(51) Int. Cl.
| | |
|---|---|
| *G06F 9/445* | (2018.01) |
| *G06F 8/38* | (2018.01) |
| *G06F 8/40* | (2018.01) |
| *G06F 8/61* | (2018.01) |
| *G06F 8/65* | (2018.01) |
| *G06F 8/77* | (2018.01) |
| *G06F 9/455* | (2018.01) |

(Continued)

(52) U.S. Cl.
CPC . *G06F 8/65* (2013.01); *G06F 8/61* (2013.01)

(58) Field of Classification Search
CPC ..... G06F 8/65; G06F 8/61; G06F 8/40; G06F 11/3612; G06F 9/5005; G06F 8/60; G06F 8/71; G06F 11/3688; G06F 11/3684; G06F 3/0689; G06F 11/0712; G06F 11/2035; G06F 21/56; G06F 21/78
See application file for complete search history.

(56) References Cited

U.S. PATENT DOCUMENTS

| | | | |
|---|---|---|---|
| 7,509,519 B2 * | 3/2009 | Srivastava | .......... G06F 11/0709 |
| | | | 714/26 |
| 7,761,600 B2 | 7/2010 | Terrill | |
| 8,401,022 B2 | 3/2013 | Maes | |

(Continued)

*Primary Examiner* — Thuy Dao
(74) *Attorney, Agent, or Firm* — David R. Stevens; Stevens Law Group

(57) ABSTRACT

The present invention extends to methods, systems, and computer program products for implementing an Infrastructure Management Service (IMS). A selected abstract function workflow defines an order for implementing a plurality of different abstract functions for a use case. A bare metal server of a specified configuration is selected to receive the use case. A bare metal profile pack corresponding the specified configuration and use case is accessed. A plurality of different concrete functions within the bare metal profile pack and corresponding to the plurality of different abstract functions are identified. A secure shell protocol daemon acting as a an IMS agent at the bare metal server receives instructions from worker threads executing the plurality of different concrete functions to implement the use case on the bare metal server.

14 Claims, 5 Drawing Sheets

(51) Int. Cl.
G06F 9/50 (2006.01)
G06F 11/36 (2025.01)

(56) References Cited

U.S. PATENT DOCUMENTS

| | | | |
|---|---|---|---|
| 8,498,290 | B2 | 7/2013 | Hughston |
| 8,811,977 | B2 | 8/2014 | Austin |
| 9,311,160 | B2 | 4/2016 | Parker |
| 9,819,540 | B1 | 11/2017 | Bahadur |
| 9,906,464 | B2 | 2/2018 | Attanasio |
| 11,698,780 | B2 * | 7/2023 | Cao ......................... G06F 40/30 |
| | | | 717/176 |
| 12,153,913 | B2 * | 11/2024 | Bafna ................... G06F 3/0689 |
| 12,254,011 | B2 * | 3/2025 | Moorthy ........... G06F 16/24568 |
| 12,445,427 | B2 * | 10/2025 | Atur .......................... G06F 8/65 |
| 2002/0165819 | A1 | 11/2002 | McKnight et al. |
| 2013/0191536 | A1 | 7/2013 | Noldus |
| 2014/0040343 | A1 | 2/2014 | Nickolov et al. |
| 2018/0329862 | A1 | 11/2018 | Cao et al. |
| 2019/0303212 | A1 | 10/2019 | Bosch et al. |

* cited by examiner

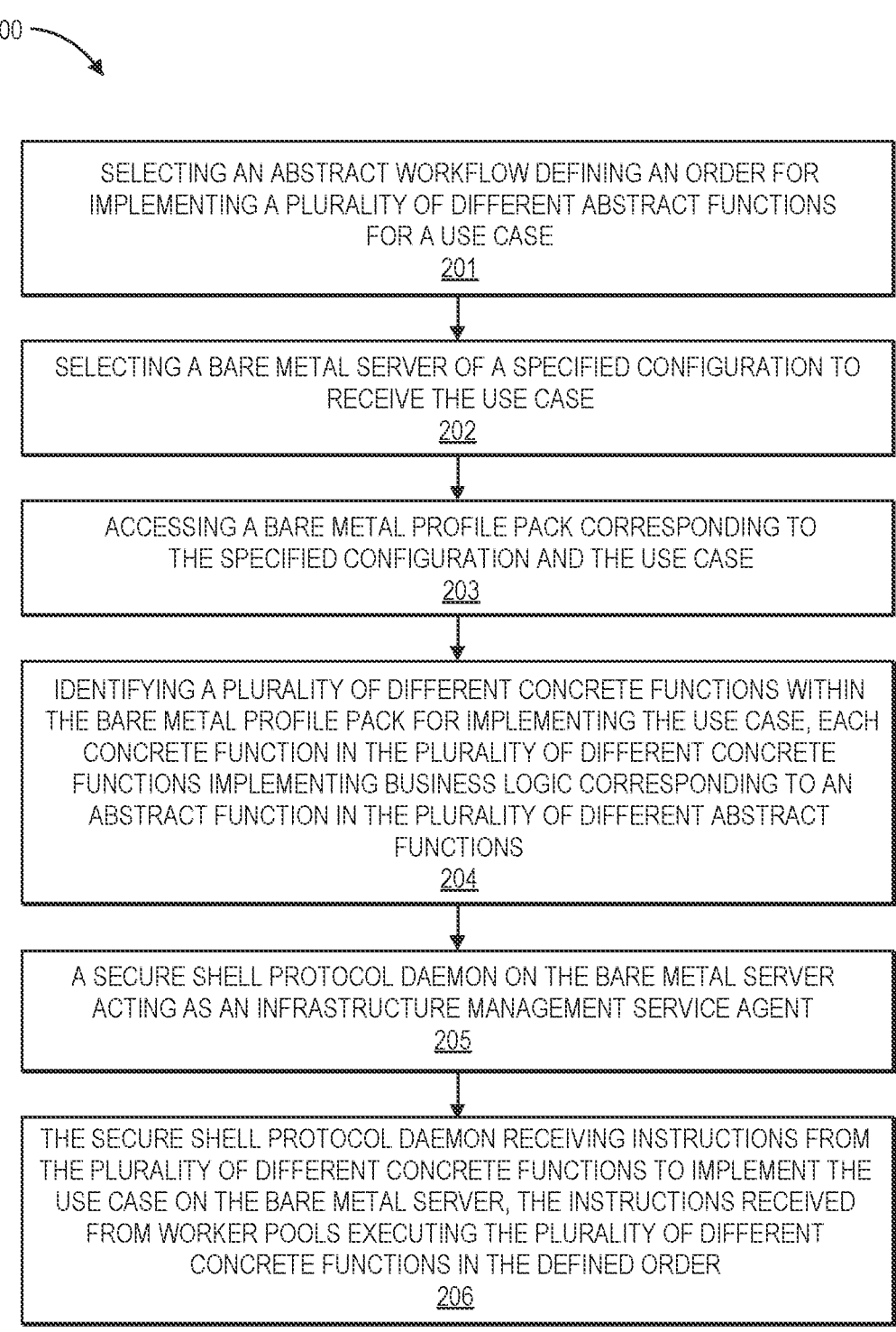

200

SELECTING AN ABSTRACT WORKFLOW DEFINING AN ORDER FOR IMPLEMENTING A PLURALITY OF DIFFERENT ABSTRACT FUNCTIONS FOR A USE CASE
201

SELECTING A BARE METAL SERVER OF A SPECIFIED CONFIGURATION TO RECEIVE THE USE CASE
202

ACCESSING A BARE METAL PROFILE PACK CORRESPONDING TO THE SPECIFIED CONFIGURATION AND THE USE CASE
203

IDENTIFYING A PLURALITY OF DIFFERENT CONCRETE FUNCTIONS WITHIN THE BARE METAL PROFILE PACK FOR IMPLEMENTING THE USE CASE, EACH CONCRETE FUNCTION IN THE PLURALITY OF DIFFERENT CONCRETE FUNCTIONS IMPLEMENTING BUSINESS LOGIC CORRESPONDING TO AN ABSTRACT FUNCTION IN THE PLURALITY OF DIFFERENT ABSTRACT FUNCTIONS
204

A SECURE SHELL PROTOCOL DAEMON ON THE BARE METAL SERVER ACTING AS AN INFRASTRUCTURE MANAGEMENT SERVICE AGENT
205

THE SECURE SHELL PROTOCOL DAEMON RECEIVING INSTRUCTIONS FROM THE PLURALITY OF DIFFERENT CONCRETE FUNCTIONS TO IMPLEMENT THE USE CASE ON THE BARE METAL SERVER, THE INSTRUCTIONS RECEIVED FROM WORKER POOLS EXECUTING THE PLURALITY OF DIFFERENT CONCRETE FUNCTIONS IN THE DEFINED ORDER
206

```
Quanta.Altiostar.du.tar.gz
 ├ manifest.yaml -----------------------------> Similar to helm notes
 ├ drivers/ ----------------------------------> Kernel/Usermode Drivers for hardware devices
 │  ├ i40e.ko
 │  ├ iavf.ko
 │  ├ igb_uio.ko
 │  └ i40evf-3.6.15-1.x86_64.rpm
 ├ main.ks -----------------------------------> Kickstarter file
 ├ pre/ --------------------------------------> Pre-install scripts
 ├ post/ -------------------------------------> Post-install scripts
 ├ firmwares/ --------------------------------> Firmwares for all the included hardware devices
 │  ├ nic/
 │  ├ ssd/
 │  ├ raid/
 │  ├ bios/
 │  └ bmc/
 ├ packages/
 │  ├ os/ ------------------------------------> Additional OS packages like RT kernel
 │  ├ du/ ------------------------------------> RAN DU specific packages
 │  ├ app/ -----------------------------------> Application specific packages which are needed for FPGA configurati
 │  └ sriov/ ---------------------------------> SRIOV specific packages
 ├ configs/
 │  ├ ptp.conf ------------------------------> Config for precision time protocol (PTP)
 │  ├ ptp4l.options ------------------------> Options for precision time protocol (PTP)
 │  ├ phc2sys.options -----------------------> Options to synchronize system clock to PTP Hardware Clock (PHC)
 │  ├ tuned.conf ---------------------------> Performance tuning configs
 │  ├ otupdate.sh ---------------------------> One time service updates to be performed when OS boots up for the f
 │  └ cpu_isolation ------------------------> CPU isloation configs
 └ functions/ --------------------------------> Functions to be imported to MBCAP
    ├ bios_upgrade.go
    ├ nic_upgrade.go
    ├ bmc_upgrade.go
    └ quanta_metrics.go
```

FIG. 3A

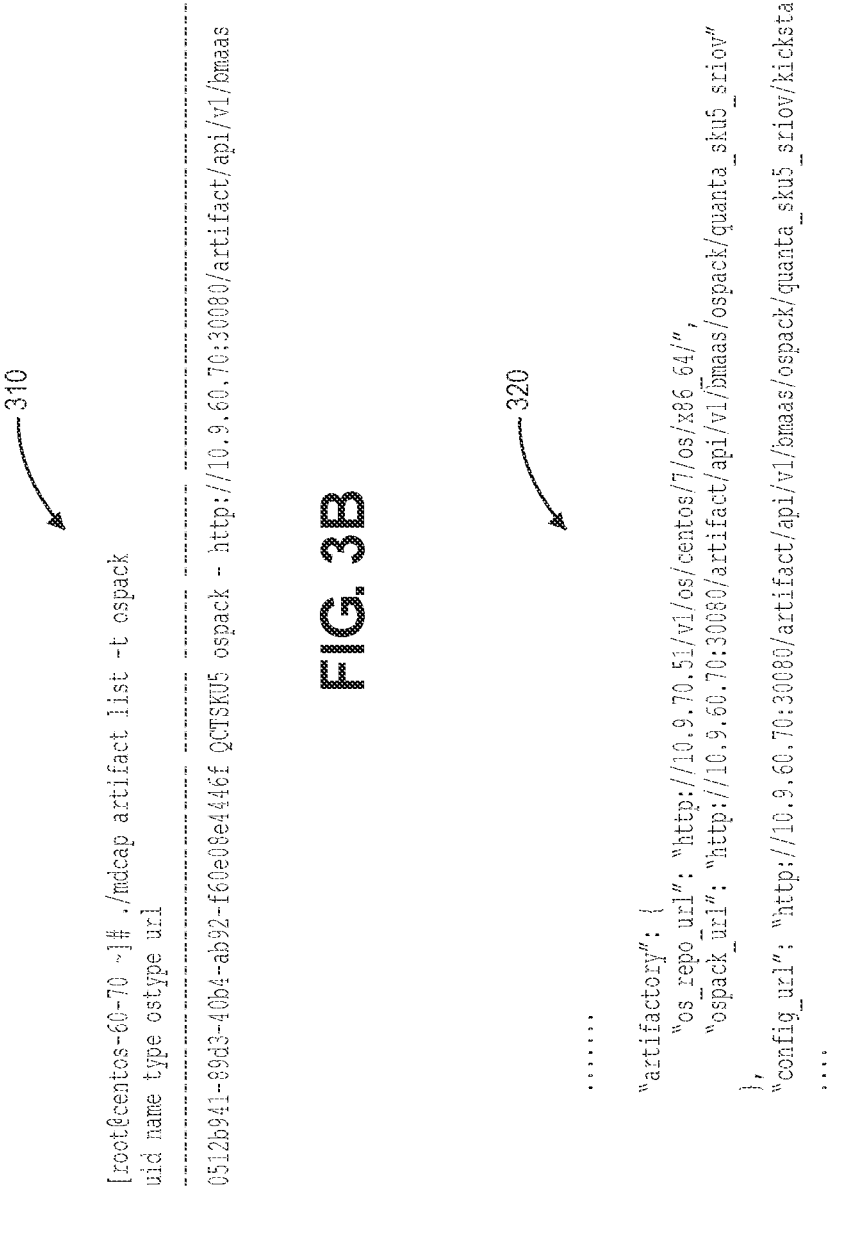

```
[root@centos-60-70 ~]# ./mdcap artifact list -t ospack
uid name type ostype url
---------------------------------------------------------------
0512b941-89d3-40b4-ab92-f60e09e4446f QCTSKU5 ospack - http://10.9.60.70:30080/artifact/api/v1/bmaas
```

FIG. 3B

```
.......
"artifactory": {
    "os_repo_url": "http://10.9.70.51/v1/os/centos/7/os/x86_64/",
    "ospack_url": "http://10.9.60.70:30080/artifact/api/v1/bmaas/ospack/quanta_sku5_sriov"
},
"config_url": "http://10.9.60.70:30080/artifact/api/v1/bmaas/ospack/quanta_sku5_sriov/kickstart/ma
....
```

FIG. 3C

IMPLEMENTING AN INFRASTRUCTURE MANAGEMENT SERVICE

CROSS-REFERENCE TO RELATED APPLICATIONS

Not applicable.

BACKGROUND

1. Field of the Invention

This invention relates generally to the field of cellular communication, and, more particularly, to implementing an Infrastructure Management Service (IMS).

2. Related Art

Systemd is a software suite that provides an array of system components for Linux operating systems. Systemd can unify service configuration and behavior across Linux distributions. Systemd includes a system and service manager initialization system used to bootstrap user space and manage user processes.

Infrastructure Management Service (IMS) can run as a systemd process on a bare metal server. As such, an IMS agent can be designed for a specific set of call flows (e.g., zero touch provisioning (ztp)) and life cycle management functionality, including: upgrading OS, installing packages, configuring Network Time Protocol (NTP), etc. To add a new set of commands or configurations to an IMS agent the IMS agent typically needs to be recompiled.

When an IMS agent runs as a systemd process, the IMS agent needs to be monitored to ensure smooth operation and to take corrective action when appropriate. An IMS agent can handle interactions between firmware and hardware and is thus prone to bugs and crashes. If an IMS agent crashes and stops running, all callflow functionality and lifecycle management operations re broken.

From time to time, IMS agents require upgrade. In some environments, Service Management and Orchestration (SMO) (an automation platform for Open RAN Radio resources) manages numerous (e.g., thousands or more) bare metal servers. Upgrading IMS agents at a large scale can be difficult. During an upgrade window, SMO can also block operations to an IMS agent. Upgrade processes can also experience errors due to network outages, download issues, rollbacks, etc.

Further, IMS agents can be designed per bare metal server. An IMS agent designed for one bare metal server (e.g., Dell iDRAC 9) may not run on another bare metal server (e.g., HPE ILO v5). That is, IMS agent development is server specific. Since IMS agents are installed and run on bare metal servers management can be difficult.

BRIEF DESCRIPTION OF THE DRAWINGS

The specific features, aspects and advantages of the present invention will become better understood with regard to the following description and accompanying drawings where:

FIG. 2 illustrates a flow chart of an example method for implementing an Infrastructure Management Service.

FIG. 3A illustrates an example profile pack.

FIG. 3B illustrates an example list of OSpacks.

FIG. 3C illustrates an example bare metal JSON configuration.

DETAILED DESCRIPTION

Figure 1:
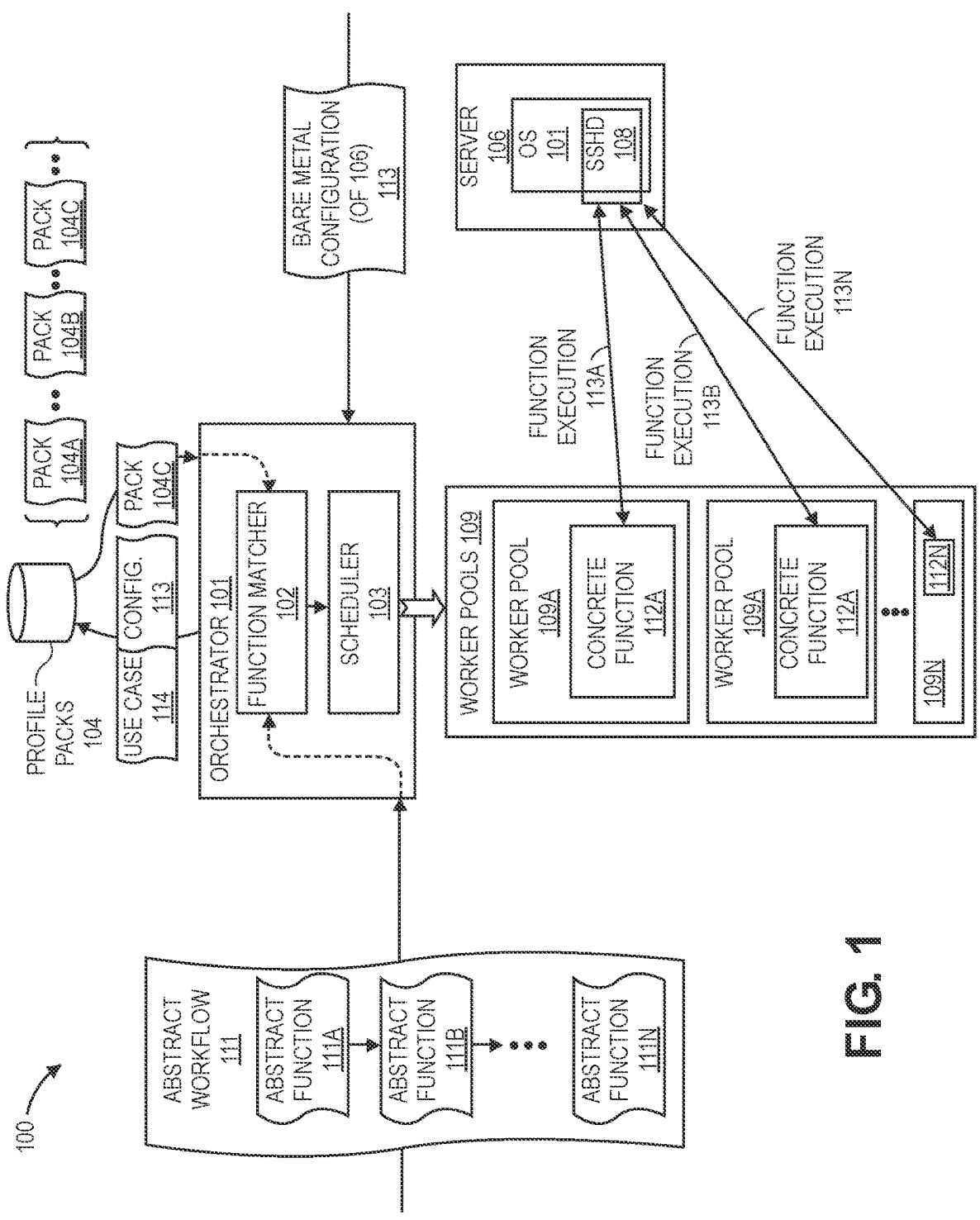
FIG. 1 illustrates an example architecture that facilitates implementing an Infrastructure Management Service.

The present invention extends to methods, systems, and computer program products for implementing an Infrastructure Management Service (IMS).

An abstract function workflow is selected. The abstract function workflow defines an order for implementing a plurality of different abstract functions for a use case. A bare metal server of a specified configuration is selected to receive the use case. A bare metal profile pack is accessed. The bare metal profile pack corresponds to the specified configuration and the use case.

A plurality of different concrete functions within the bare metal profile pack for implementing the use case are identified. Each concrete function in the plurality of different concrete functions implements business logic corresponding to an abstract function in the plurality of different abstract functions. A secure shell protocol daemon on the bare metal server acts an IMS agent. The secure shell protocol daemon receives instructions from the plurality of different concrete functions to implement the use case on the bare metal server. The instructions are received from worker pools executing the plurality of different concrete functions in the defined order . . .

In this description and the following claims, "Open Radio Access Network (O-RAN)" is defined as part of a telecommunication system. An O-RAN implements radio access technology. Conceptually, an O-RAN is arranged between User Equipment (UE) (e.g., a mobile phone, a computer, or other wirelessly connected devices) and a core network. An O-RAN can include one or more nodes that facilitate connections between UE and a core network. O-RAN nodes can include one or more "Centralized Units (CUs)", one or more "Distributed Units (DUs)", and one or more "Radio Units (RUs)".

In general, a CU provides support for the higher layers of protocol stack (higher L2 and L3), such as, Service Data Adaptation Protocol (SDAP), Packet Data Convergence Protocol (PDCP), and Radio Resource Control Protocol (RRC). A DU provides support for the lower layers of the protocol stack (L1 and lower L2), such as, Radio Link Control Protocol (RLC), Medium Access Control Protocol (MAC), and upper parts of a Physical layer. One CU can control multiple DUs. Each DU can support one or more cells. A DU may be deployed on site at a commercial-off-the-shelf (COTS) server. A cell can include an RU that converts between radio signals sent to and from an antenna and digital signals for transfer over packet networks. An RU can also handle digital front end (DFE) and lower parts of a Physical Layer.

In this description and the following claims, "Infrastructure Management Service (IMS)" is defined as administering and managing technology, information and data in a proactive way. IMS includes installing and upgrading firmware and software on bare metal servers.

In this description and the following claims, "Function as a service (FaaS)" is a defined as a category of cloud computing services that provides a platform allowing customers to develop, run, and manage application functionalities minimizing (or even eliminating) the complexity of building and maintaining underlying app development infrastructure. Building an application using an FaaS model can facilitate a "serverless" architecture, such as, when building microservices applications. FaaS does not require any server process constantly being run. Developers may pay for function execution time (but not necessarily process idle time). As such, lower costs at higher scalability can be achieved.

In this description and the following claims, an "abstract function" (or "anonymous function") is defined as a function definition that is not bound to an identifier. Abstract functions can be arguments passed to higher-order functions (e.g., concrete functions) or can be used for constructing the result of a higher-order function (e.g., a concrete function) that needs to return a function. When a function is used once or a limited number of times, an abstract function may be syntactically lighter than using a named function. Abstract functions can also be referred to as function literals, lambda abstractions, lambda functions, or lambda expressions.

An abstract function can define an abstract functionality to a user but hide the implementation and/or internal details. In one aspect, an abstract function is a method that includes a method definition but does not contain implementation/ definition (e.g., a signature without a body). For example, an abstract function can abstractly define upgrading a Basic Input/Output System (BIOS) without any written implementation/definition of how to upgrade the BIOS.

In this description and the following claims, a "workflow" is defined a flow of calls to different functions. In one aspect, a workflow is an abstract workflow defining an order in which plurality of abstract functions are to be called. For example, an abstract workflow can define upgrading a BIOS at a bare metal server, then upgrading a Baseboard Management Controller (BMC) at the bare metal server, and then installing an operating system at the bare metal server.

In this description and the following claims, a "concrete function" is defined as a function that includes a method definition and contains a written implementation/definition indicating how to implement a corresponding abstract function. For a bare metal server, a concrete function can define an entire business logic implementation written in a bare metal profile pack. Bare metal profile packs can differ for different bare metal configurations, for example, by vendor, by installed components, by installed capabilities, etc. Bare metal profile packs can also differ by configuration use case, such as, Radio Access Network (RAN), edge, core, database, etc.

In one aspect, a bare metal profile pack can include a collection of configurations (hardware, firmware, software), firmware, and software specific to server manufacturer (Quanta, Dell, Super Micro, HPE, etc) Stock Keeping Units (SKUs). For example, Quanta Altiostar RAN Profile Pack can be a tar ball of configurations, firmware, and software for bringing up Altiostar RAN on Quanta Server. As another example, a Dell Affirmed Core Profile Pack can be a tar ball of configurations, firmware, and software for bringing up Mariner OS and Affirmed 5G Core. As a further example, a Super Micro Yuga Byte Profile Pac can be a tar ball of configurations, firmware, and software for bringing up Yuga Byte Distributed database on Super Micro.

In this description and the following claims, "zero-touch provisioning (ZTP)" is defined as a technique for at least partially automatically setting up devices. ZTP can automate operations, such as, for example, installing operating systems, updating operating systems, deploying patches or bug fixes, adding features, upgrading Basic Input/Output System (BIOS), upgrading a BMC, upgrading a network interface card (NIC), etc. ZTP can be implemented by starting an abstract function workflow and referring to corresponding concrete functions when appropriate.

In this description and the following claims, "Secure Shell Protocol (SSH)" is defined as a cryptographic protocol for operating network services securely over an unsecured network. SSH operates as a layered protocol suite comprising hierarchical components: a transport layer provides server authentication, confidentiality, and integrity, a user authentication layer validates the user to the server, and a connection layer multiplexes an encrypted tunnel into multiple logical communication channels.

An SSH client program can be used for establishing connections to an SSH daemon, such as, SSHD, accepting remote connections. SSH can be used in cloud computing to solve connectivity problems, for example, reducing security issues of exposing a cloud-based virtual machine directly on the Internet. An SSH tunnel can provide a secure path over the Internet, through a firewall to a virtual machine.

In the description and the following claims, a "Secure Shell Protocol Daemon (SSHD)" is defined as a server process that listens to incoming connections using SSH and acts as a server for the SSH protocol. An SSHD can handle use authentication, encryption, terminal connections, file transfers, and tunneling.

An initial SSHD process can be started when a system boots. The initial SSHD process can act as a master server that listens to incoming connections. The initial SSHD process can also be the parent process of the other sshd processes. In general, if SSHD is upgraded or restarted, (e.g., only) the master server is restarted. SSHD is configured so that the server processes serving existing connections continue to operate. Continuing to serve existing connections minimizes the disruption to users when, for example, server configuration is changed.

In this description and the following claims, "Life Cycle Management (LCM)" is defined as managing O-RAN costs, assets, sites, equipment, capabilities, projects, etc. LCM can include asset life-cycle management, supply chain management, and financials adapted for telecommunication network operators. LCM can include a spectrum of network planning and realization tasks from supply and demand planning to project management, cost, revenue planning, and asset accounting. LCM can include: (a) Day-(−1)-before device onboarding, (b) Day-0—during device on-boarding, (c) Day-1 after device on-boarding, (d) Day2 . . . . N-After Day-1

Day-(−1) can include bootstrap, pre-requisite, or pre-existing configurations on a device (e.g., a bare metal server). Day-0 can include configurations pushed via ZTP or configurations applied during device on-boarding. Day-1 can include configurations applied after device on-boarding, configurations pushed after a device is added, or pushed directly to a device via a controller. Day2 . . . . N incudes ongoing configurations application after Day-1 configurations.

FIG. 1 illustrates an example architecture 100 that facilitates implementing IMS. As depicted, computer architecture includes orchestrator 101, profile packs 104, and bare metal server 106.

Orchestrator 101 can include a workflow manager that implements Service Management and Orchestration (SMO). Orchestrator 101 can include components to orchestrate and manage lifecycle of any workflow, including bare-metal provisioning, cloud platform instantiation, Network Functions (NF) lifecycle management, Network Services (NS) lifecycle management and Methods Of Procedures (MOPs), all of which can be triggered through a policy engine. Automated workflows support Cloud Native Network Functions (CNF), Virtual Network Functions (VNF) and 3rd party Physical Network Functions (PNF), simultaneously.

Orchestrator 101 further includes function match 102 and scheduler 103. In general, function matcher 102 can match abstract functions to corresponding concrete functions included in profile packs. In general, scheduler 103 can schedule concrete function for execution in a defined order. In one aspect, scheduler 103 configures worker pools to execute concrete functions and send instructions to SSHDs acting as IMS agents at bare metal servers.

In general, the orchestrator 101 can utilize a FaaS and/or a lambda function approach to realize concrete functions corresponding to abstract functions contained in abstract workflows.

Profile packs 104 can include a plurality of profile packs including profile packs 104A, 104B, 104C etc. Different profile packs within profile packs 104 can differ by bare metal configurations (e.g., by vendor, by brand, by installed components, by installed capabilities, etc.) and/or by configuration use case (e.g., Radio Access Network (RAN), edge, core, database, etc.)

Bare metal server 106 includes operating system 107 running SSHD 108. Bare metal server 106 can be a particular brand of server with particular components and capabilities represented in bare metal configuration 113. Orchestrator 101 can access bare metal configuration 113 from an external source, such as, a website or database. In another aspect, orchestrator 101 profiles server 106 to derive bare metal configuration 113.

FIG. 2 illustrates a flow chart of an example method 200 for implementing IMS. Method 200 will be described with respect to the components and data in cellular network architecture 100.

Method 200 includes selecting an abstract workflow defining an order for implementing a plurality of different abstract functions for a use case (201). For example, orchestrator 101 can access abstract workflow 111. Abstract workflow 111 can be manual created by a user or stored in a database. Abstract workflow 111 can define an order for implementing abstract functions 111A, 111B, . . . , 111N to implement use case 114. Use case 114 can be selected from among RAN, edge, code, database, etc.

Method 200 includes selecting a bare metal server of a specified configuration to receive the use case (202). For example, orchestrator 101 can select bare metal server 106 having configuration 113 to receive use case 114. Bare metal server 106 can be selected from among a plurality of bare metal servers of different configurations.

Method 200 includes accessing a bare metal profile pack corresponding to the specified configuration and the use case (203). For example, orchestrator 101 can query profile packs 104 with use case 114 and bare metal configuration 113. Profile packs 104 can determine that profile pack 104C is an appropriate match based on use case 114 and bare metal configuration 113. Profile packs 104 can return profile pack 104C to orchestrator 101. Profile pack 104C can include a plurality of concrete functions for implementing use case 114 at bare metal server 106.

Method 200 includes identifying a plurality of different concrete functions within the bare metal profile pack for implementing the use case, each concrete function in the plurality of different concrete functions implementing business logic corresponding to an abstract function in the plurality of different abstract functions (204). For example, function matcher 102 can match concrete functions 112A, 112B, . . . 112N (included in profile pack 104C) to corresponding abstract functions 111A, 111B, . . . 111N. In one aspect, scheduler 103 schedules concrete functions 112A, 112B, . . . 112N within worker pools 109A, 109B, . . . 109N in worker pools 109. Concrete functions 112A, 112B, . . . 112N can implement business logic corresponding to abstract functions 111A, 111B, . . . 111N.

Method 200 includes a secure shell protocol daemon on the bare metal server acting as as an Infrastructure Management Service agent (205). For example, SSHD 108 can act as an IMS agent at bare metal server 106.

Method 200 includes the secure shell protocol daemon receiving instructions from the plurality of different concrete functions to implement the use case on the bare metal server, the instructions received from worker pools executing the plurality of different concrete functions in the defined order (206). For example, worker pool 109A can perform functions execution 113A of concrete function 112A sending instructions to SSHD 108. SSHD 108 can receive instructions from function execution 113A. Similarly, worker pool 109B can perform functions execution 113B of concrete function 112B sending instructions to SSHD 108. SSHD 108 can receive instructions from function execution 113B. Likewise, worker pool 109N can perform functions execution 113N of concrete function 112N sending instructions to SSHD 108. SSHD 108 can receive instructions from function execution 113N.

Collectively, instructions from function executions 113A, 113B, . . . , 113N can implement use case 114 at bare metal server 106.

In one aspect, orchestrator 101 manages and orchestrates components in an O-RAN. Orchestrator 101 installs an O-RAN use case onto bare metal server 106 to configure bare metal server 106 as a component within the O-RAN, such as, for example, part of a CU or DU.

In one aspect, an example of abstract functions may be:
1. _upgrade_bios
2. _upgrade_bmc
3. install_os
A corresponding example, abstract workflow may be:
1. _ztp_server
   _upgrade_bios->_upgrade_bmc-> install_os FIG. 3A illustrates an example profile pack 300. Contents of profile pack 300 can access other files using macros like {PROFILE_PACK_URL}, which can be resolved by orchestrator 101 with actual URLs.

A user can consume profile pack 300 by uploading an operating system (OS) to an artifactory or have an external artifactory host the operating system. The user can get a profile pack tarball and upload the profile pack tarball to the artifactory. The artifactory can unpack the profile tarball, such as, for example:
    artifact upload Quanta_SKU5_SRIOV_OSPack-0.1.tgz
       quanta_sku5_sriov ospack Unpacking can reveal a list of ospacks 310 as depicted in FIG. 3B. A bare metal JSON configuration 320 can be edited as depicted in FIG. 3C. The bare metal JSON can then be added to orchestrator 101 and the OS installed.

To install an OS a main.ks can be modified to refer to artifacts present inside profile package 300 with the following change:
    BMAAS_ARTIFACTORY_URL={{artifactory.ospack_
       url}}

Figure 4:
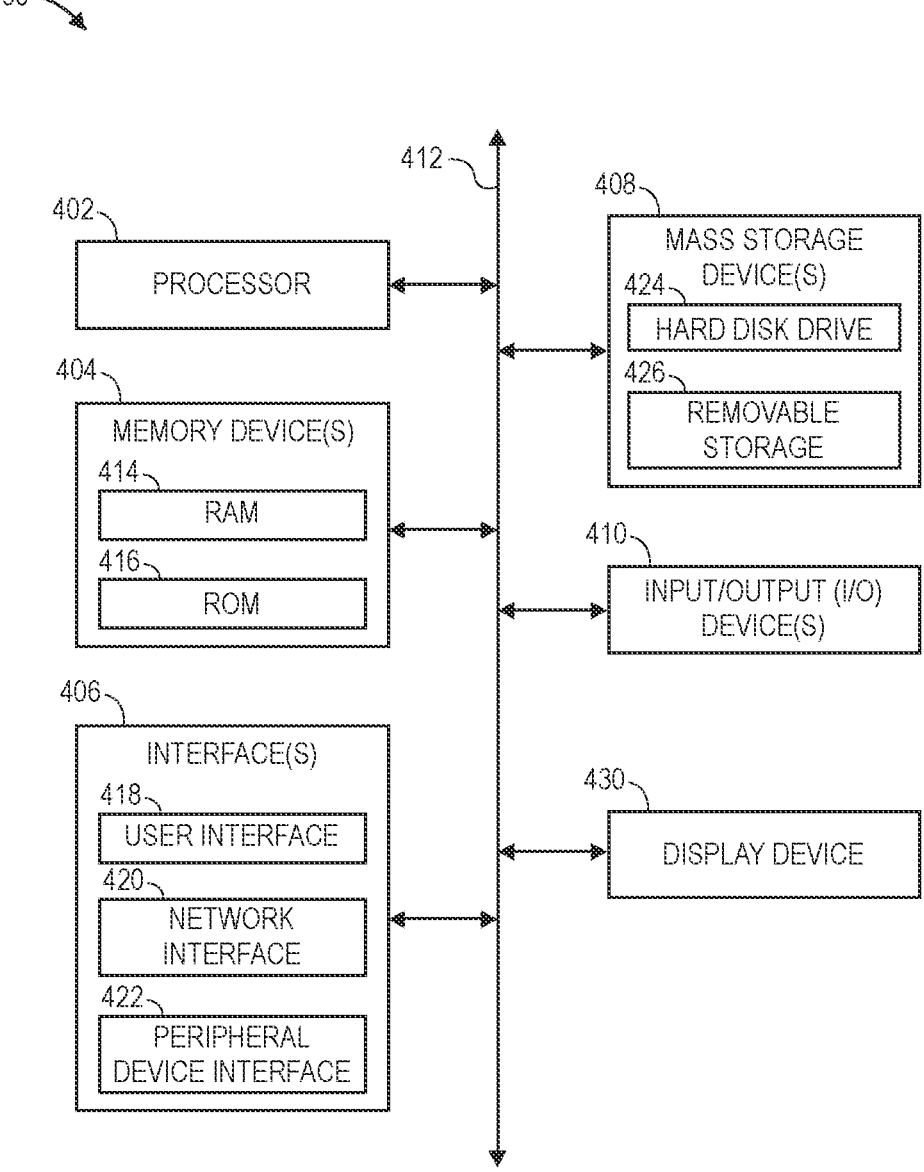
FIG. 4 illustrates an example block diagram of a computing device.

The {{artifactory.ospack_url}} macro can be resolved inside the worker, main.ks is updated with actual value. The bare metal imports this rendered KS file and downloads the packages like:
    curl -g --fail -o/ tmp/vdu_extra_pkg.tgz ${BMAAS_AR-
       TIFACTORY_URL}/packages/du/vdu_extra_pkg.tgz FIG. 4 illustrates an example block diagram of a computing device 400. Computing device 400 can be used to perform various procedures, such as those discussed herein. Computing device 400 can function as a server, a client, or any other computing entity. Computing device 400 can perform various communication and data transfer functions as described herein and can execute one or more application programs, such as the application programs described herein. Computing device 400 can be any of a wide variety of computing devices, such as a mobile telephone or other mobile device, a desktop computer, a notebook computer, a server computer, a handheld computer, tablet computer and the like.

Computing device 400 includes one or more processor(s) 402, one or more memory device(s) 404, one or more interface(s) 406, one or more mass storage device(s) 408, one or more Input/Output (I/O) device(s) 410, and a display device 430 all of which are coupled to a bus 412. Processor(s) 402 include one or more processors or controllers that execute instructions stored in memory device(s) 404 and/or mass storage device(s) 408. Processor(s) 402 may also include various types of computer storage media, such as cache memory.

Memory device(s) 404 include various computer storage media, such as volatile memory (e.g., random access memory (RAM) 414) and/or nonvolatile memory (e.g., read-only memory (ROM) 416). Memory device(s) 404 may also include rewritable ROM, such as Flash memory.

Mass storage device(s) 408 include various computer storage media, such as magnetic tapes, magnetic disks, optical disks, solid state memory (e.g., Flash memory), and so forth. As depicted in FIG. 4, a particular mass storage device is a hard disk drive 424. Various drives may also be included in mass storage device(s) 408 to enable reading from and/or writing to the various computer readable media. Mass storage device(s) 408 include removable media 426 and/or non-removable media.

I/O device(s) 410 include various devices that allow data and/or other information to be input to or retrieved from computing device 400. Example I/O device(s) 410 include cursor control devices, keyboards, keypads, barcode scanners, microphones, monitors or other display devices, speakers, printers, network interface cards, modems, cameras, lenses, radars, CCDs or other image capture devices, and the like.

Display device 430 includes any type of device capable of displaying information to one or more users of computing device 400. Examples of display device 430 include a monitor, display terminal, video projection device, and the like.

Interface(s) 406 include various interfaces that allow computing device 400 to interact with other systems, devices, or computing environments as well as humans. Example interface(s) 406 can include any number of different network interfaces 420, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 418 and peripheral device interface 422.

Bus 412 allows processor(s) 402, memory device(s) 404, interface(s) 406, mass storage device(s) 408, and I/O device(s) 410 to communicate with one another, as well as other devices or components coupled to bus 412. Bus 412 represents one or more of several types of bus structures, such as a system bus, PCI bus, IEEE 1394 bus, USB bus, and so forth.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, abstract functions, abstract workflows, concrete functions, concrete workflows, profile packs, use cases, bare metal configurations, IMS agents, JSON, tar balls, firmware, software, configurations, SKUs, ospacks, KS files, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, abstract functions, abstract workflows, concrete functions, concrete workflows, profile packs, use cases, bare metal configurations, IMS agents, JSON, tar balls, firmware, software, configurations, SKUs, ospacks, KS files, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications, variations, and combinations are possible in light of the above teaching. Further, it should be noted that any or all of the aforementioned alternate implementations may be used in any combination desired to form additional hybrid implementations of the disclosure.

What is claimed:

1. A computer implemented method comprising:
   selecting an abstract workflow defining an order for implementing a plurality of different abstract functions for a use case;
   selecting a bare metal server of a specified configuration to receive the use case;
   accessing a bare metal profile pack corresponding to the specified configuration and the use case;
   identifying a plurality of different concrete functions within the bare metal profile pack for implementing the use case, each concrete function in the plurality of different concrete functions implementing business logic corresponding to an abstract function in the plurality of different abstract functions;
   a secure shell protocol daemon on the bare metal server acting as an Infrastructure Management Service agent; and
   the secure shell protocol daemon receiving instructions from the plurality of different concrete functions to implement the use case on the bare metal server, the instructions received from worker pools executing the plurality of different concrete functions in the defined order.

2. The method of claim 1, wherein receiving instructions from the plurality of different concrete functions comprises receiving the instructions from concrete functions authored as part of the bare metal profile pack.

3. The method of claim 1, wherein receiving instructions from the plurality of different concrete functions comprises achieving a life cycle management (LCM) of day-0 ops.

4. The method of claim 1, wherein receiving instructions from the plurality of different concrete functions comprises achieving a life cycle management (LCM) of day-n ops.

5. The method of claim 1, wherein receiving instructions from the plurality of different concrete functions comprises receiving instructions to upgrade BIOS at the bare metal server.

6. The method of claim 1, wherein receiving instructions from the plurality of different concrete functions comprises receiving instructions to upgrade a Baseboard Management Controller (BMC) at the bare metal server.

7. The method of claim 1, wherein receiving instructions from the plurality of different concrete functions comprises receiving instructions to install an operating system at the bare metal server.

8. A computer system comprising:

a processor;

system memory coupled to the processor and storing instructions configured to cause the processor to:

select an abstract workflow defining an order for implementing a plurality of different abstract functions for a use case;

select a bare metal server of a specified configuration to receive the use case;

access a bare metal profile pack corresponding to the specified configuration and the use case;

identify a plurality of different concrete functions within the bare metal profile pack for implementing the use case, each concrete function in the plurality of different concrete functions implementing business logic corresponding to an abstract function in the plurality of different abstract functions;

cause a secure shell protocol daemon on the bare metal server to act as an Infrastructure Management Service agent; and cause the secure shell protocol daemon to receive instructions from the plurality of different concrete functions to implement the use case on the bare metal server, the instructions received from worker pools executing the plurality of different concrete functions in the defined order.

9. The computer system of claim 8, wherein instructions configured to receive instructions from the plurality of different concrete functions comprise instructions configured to receive the instructions from concrete functions authored as part of the bare metal profile pack.

10. The computer system of claim 8, wherein instructions configured to receive instructions from the plurality of different concrete functions comprise instructions configured to achieve a life cycle management (LCM) of day-0 ops.

11. The computer system of claim 8, wherein instructions configured to receive instructions from the plurality of different concrete functions comprise instructions configured to achieving a life cycle management (LCM) of day-n ops.

12. The computer system of claim 8, wherein instructions configured to receive instructions from the plurality of different concrete functions comprise instructions configured to receive instructions to upgrade BIOS at the bare metal server.

13. The computer system of claim 8, wherein instructions configured to receive instructions from the plurality of different concrete functions comprise instructions configured to receive instructions to upgrade a Baseboard Management Controller (BMC) at the bare metal server.

14. The computer system of claim 8, wherein instructions configured to receive instructions from the plurality of different concrete functions comprise instructions configured to receive instructions to install an operating system at the bare metal server.

* * * * *